US012618697B2

(12) United States Patent
Drautz et al.

(10) Patent No.: US 12,618,697 B2
(45) Date of Patent: May 5, 2026

(54) METHOD FOR DIAGNOSING A SENSOR SYSTEM IN A PART-SPECIFIC MANNER

(71) Applicant: Robert Bosch GmbH, Stuttgart (DE)

(72) Inventors: Frank Drautz, Kirchentellinsfurt (DE); Michael Schiebold, Chemnitz (DE); Paolo Minotti, Tuebingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/650,554

(22) Filed: Feb. 10, 2022

(65) Prior Publication Data

US 2022/0276079 A1 Sep. 1, 2022

(30) Foreign Application Priority Data

Feb. 18, 2021 (DE) ..................... 10 2021 201 537.9

(51) Int. Cl.
*G01D 18/00* (2006.01)

(52) U.S. Cl.
CPC ......... *G01D 18/006* (2013.01); *G01D 18/008* (2013.01)

(58) Field of Classification Search
CPC .. G01D 18/006; G01D 18/008; G01D 18/002; G01P 21/00; B81C 99/003; G01L 27/002; G01R 33/0035; B81B 3/0064; G01V 13/00
See application file for complete search history.

(56) References Cited

U.S. PATENT DOCUMENTS

| | | | | |
|---|---|---|---|---|
| 7,124,047 B2* | 10/2006 | Zhang | .................. | G01D 18/008 |
| | | | | 714/47.1 |
| 10,466,298 B2* | 11/2019 | Chaware | ........... | G01R 31/2884 |
| 10,551,226 B2* | 2/2020 | Luo | ...................... | G01D 18/008 |
| 11,156,631 B2* | 10/2021 | Thompson | ............. | G01C 25/00 |
| 11,378,419 B2* | 7/2022 | Koeck | ................... | G01D 18/008 |
| 11,415,472 B2* | 8/2022 | Croce, Jr. | ............ | G01L 1/2281 |
| 11,519,934 B2* | 12/2022 | Becker | ............... | G01R 33/0035 |
| 11,913,808 B2* | 2/2024 | Zhou | ..................... | G01C 25/005 |
| 11,945,715 B2* | 4/2024 | Brueckner | .............. | G01K 1/20 |
| 2006/0052959 A1* | 3/2006 | Zhang | ..................... | G01D 3/022 |
| | | | | 702/104 |
| 2012/0215477 A1* | 8/2012 | Tuck | ........................ | G01P 21/00 |
| | | | | 73/1.38 |

(Continued)

FOREIGN PATENT DOCUMENTS

DE 102018207573 A1 11/2019

OTHER PUBLICATIONS

Alan S. Morris, Reza Langari, Chapter 2—Instrument Types and Performance Characteristics, Editor(s): Alan S. Morris, Reza Langari, Measurement and Instrumentation, (Year: 2012).*

*Primary Examiner* — Huy Q Phan
*Assistant Examiner* — Martin Walter Braunlich
(74) *Attorney, Agent, or Firm* — NORTON ROSE FULBRIGHT US LLP

(57) ABSTRACT
A method for carrying out a diagnosis of a sensor system. The method including: (i) ascertaining a processing specification of a test signal and/or of a characteristic physical variable and/or its respective change as a function of at least one part-specific property of the sensor system; and (ii) carrying out a subsequent diagnosis of a sensor element of the sensor system, using the processing specification ascertained in (i).

13 Claims, 5 Drawing Sheets

(56) References Cited

U.S. PATENT DOCUMENTS

| 2014/0083164 | A1 |   | 3/2014 | Homeijer et al. |
|---|---|---|---|---|
| 2014/0260508 | A1 |   | 9/2014 | Dar et al. |
| 2021/0033437 | A1 | * | 2/2021 | Visconti ............... G01L 27/002 |

* cited by examiner

METHOD FOR DIAGNOSING A SENSOR SYSTEM IN A PART-SPECIFIC MANNER

CROSS REFERENCE

The present application claims the benefit under 35 U.S.C. § 119 of German Patent Application No. DE 10 2021 201 537.9 filed on Feb. 18, 2021, which is expressly incorporated herein by reference in its entirety.

FIELD

The present invention relates to a method for diagnosing a sensor system in a part-specific manner. The present invention furthermore relates to a method for manufacturing a diagnosable sensor system. The present invention furthermore relates to a computer program product.

BACKGROUND INFORMATION

A variety of different methods is increasingly used in conventional sensor systems for diagnosis, in particular for self-monitoring and self-calibration (self-sensing sensors). In addition to the obvious desirable requirement to also maintain the accuracy of the sensor which was achieved, e.g., with the aid of a suitable trim at the end of the manufacturing process as well during the entire operating duration, i.e., in particular, to compensate for, e.g., aging effects which occur, further applications include the exact and robust measurement under differing usage conditions (e.g., changed ambient condition such as temperature, moisture or mechanical stresses as they may arise, e.g., as a result of the installation or external vibrations) as well as self-monitoring of the sensor with respect to correct functional capability (the latter, in particular, in safety-relevant applications).

A method for recalibrating a sensor with the aid of a suitable test signal is described in German Patent Application No. DE 10 2018 207 573 A1, in which, in particular, a trim correction value is calculated, a corresponding relationship either being empirically determined in advance, based on a plurality of measurements on identical sensors, or determined with the aid of further influencing variables, which may also be part-specific parameters.

In some sensor systems, an identical evaluation of test signals and/or characteristic variables may lead to non-satisfactory results, in particular, when the relationship between the observed variables and the variables to be examined which is used for the diagnosis is highly dependent on further variables. One example of this is a micro-mechanical rotation rate sensor having separate drive and detection frequencies (so-called mode-split or also open-loop design, in contrast to mode-matching or also closed-loop design, in which the detection frequency has a smaller value than the drive frequency (so-called negative frequency split design).

SUMMARY

It is an object of the present invention to provide an improved method for diagnosing a sensor system.

According to a first aspect of the present invention, the object may be achieved by a method for carrying out a diagnosis of a sensor system. In accordance with an example embodiment of the present invention, the method includes the following steps:

(i) ascertaining a processing specification of a test signal and/or of a characteristic physical variable and/or its respective change as a function of at least one part-specific property of the sensor system; and (ii) carrying out a subsequent diagnosis of a sensor element of the sensor system, using the processing specification ascertained in (i).

In this way, e.g., a change in the sensitivity of the sensor element may be established, which may be improved by a recalibration based on the diagnosis during operation. Advantageously, the described method is, in particular, usable for sensor systems having relatively large tolerances during manufacture, in which, e.g., the behavior of the test signals used is highly dependent on these tolerances. One example of this are micromechanical rotation rate sensors having a negative frequency split, the method, however, being explicitly not limited to this specific sensor type.

According to a second aspect of the present invention, the object may be achieved by a method for manufacturing a sensor element of a sensor system. In accordance with an example embodiment of the present invention, the method includes the following steps:

a) ascertaining, in a part-specific manner, a mathematical relationship between a test signal and a response signal of a sensor element of the sensor system to the test signal; and b) implementing the mathematical relationship ascertained in step a) in the sensor system after a final trim of the sensor element.

Advantageous refinements of the method of the present invention are disclosed herein.

One advantageous refinement of the method of the present invention provides that a recalibration of a sensor element of the sensor system is carried out as a function of a result of the diagnosis which was carried out.

Another advantageous refinement of the method of the present invention provides that the diagnosis and/or the recalibration of the sensor element is/are carried out at defined points in time. For example, this may take place daily, weekly, monthly, etc. As an alternative, the diagnosis may be requested by the system which uses the sensor system.

In another advantageous refinement of the method of the present invention, feedback of the sensor system is provided to a user as a function of a result of the diagnosis which was carried out. In this way, e.g., an appropriate action of the user for eliminating defects of the sensor system may advantageously be initiated.

In another advantageous refinement of the method of the present invention, the processing specification is representable in the following form:

$$\Delta S = CF \cdot \Delta T + C_0$$

where:
S is a sensitivity of the sensor
T is a test signal
CF is a correlation factor between change in sensitivity and test signal
$C_0$ is a constant term in the processing specification
$\Delta$ is a change in the respective variable.

In another advantageous refinement of the method of the present invention, a constant term of the processing specification takes on the following form:

$$C_0 = CF(pp) \cdot \beta$$

3

4 where:

β is a constant which is not part-specific, but, in particular, empirically ascertained based on a large number of identical sensor elements.

In this way, processing specifications which are advantageous for practical applications are utilized.

In one advantageous refinement of the method of the present invention for manufacturing a sensor system, parameters of the ascertained mathematical relationship are calculated in a part-specific manner and stored in the sensor system. In this way, e.g., a slope of an estimation specification may be stored in the sensor system.

Another advantageous refinement of the method of the present invention for manufacturing a sensor system provides that the mathematical relationship is at least partially implemented in software and/or at least partially in hardware. For example, this may be implemented as firmware and/or as hardware in a digital part.

Another advantageous refinement of the method of the present invention for manufacturing a sensor system provides that the mathematical relationship is stored by programming a programmable memory chip.

Another advantageous refinement of the method of the present invention for manufacturing a sensor system provides that the mathematical relationship may be changed over the service life of the sensor system. In this way, e.g., a stored mathematical relationship may be modified in a simple manner. This change, in turn, takes place according to a possibly part-specific specification established at an earlier point in time, and as a function of a test signal and/or characteristic variables of the sensor system and/or its change.

Another advantageous refinement of the method of the present invention for manufacturing a sensor system provides that the mathematical relationship for a defined sensor type encompasses an approximation according to defined physical relationships. In this way, the stored estimation specification may be ascertained in a part-specific manner for each specific sensor type and be stored.

The present invention is described in detail hereafter with further features and advantages based on several figures. All described or illustrated features, either alone or in any arbitrary combination, form the subject matter of the present invention, regardless of the wording or representation thereof in the description herein or in the figures.

Described method features result similarly from correspondingly described device features, and vice versa. This means in particular that features, technical advantages and statements regarding the method for operating a mobile automated system result similarly from corresponding statements, features and advantages of the device for operating a mobile automated system, and vice versa.

DETAILED DESCRIPTION OF EXAMPLE EMBODIMENTS

Figure 1:
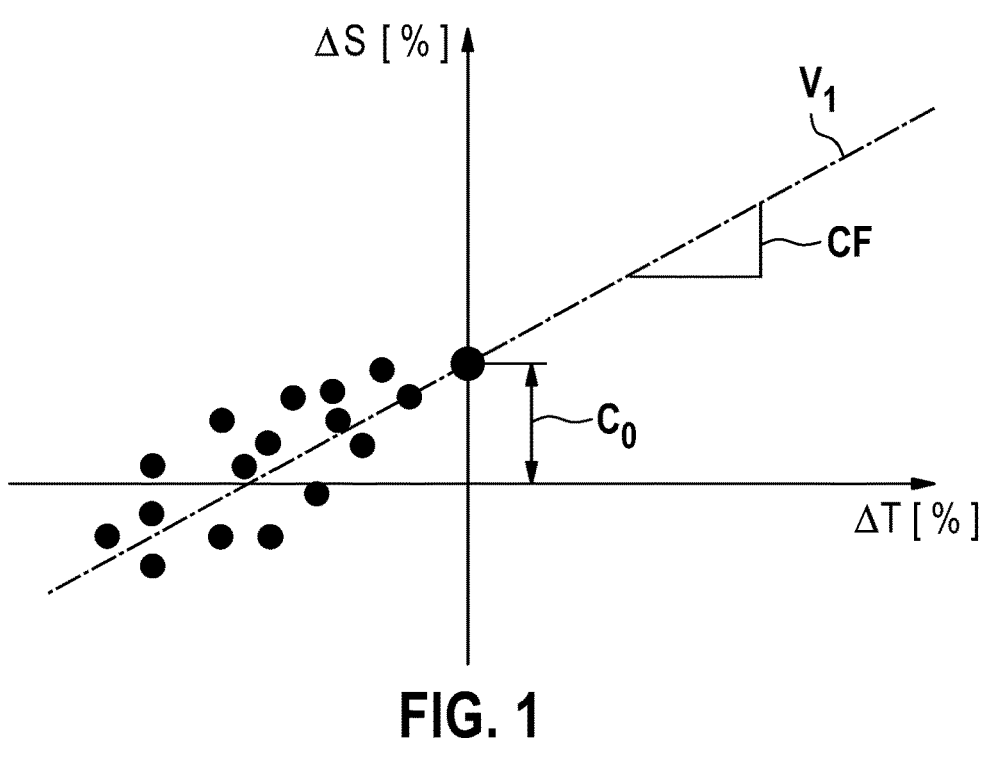
FIG. 1 shows a trim diagram used for a conventional diagnosis of a sensor system.

Hereafter, a method is described for diagnosing a sensor system, in particular for self-monitoring and self-calibrating. It is provided that the processing of values and/or changes of test signals and/or characteristic variables is carried out based on a part-specific processing specification. This processing specification is individually ascertained for each sensor before the actual diagnosis, self-monitoring or self-calibration is carried out, based on a corresponding physical understanding of the sensor system, and with the aid of suitable mathematical relationships.

For example, it is possible to utilize existing measuring variables of the final trim to define the part-specific/sensor-specific processing of pieces of information which may be obtained later during operation from the identical use of methods for diagnosing, in particular, self-monitoring or self-calibration. As an alternative, it is also possible to adapt the processing specification during operation, e.g., as a function of ambient conditions or the operating duration, based on the observation or the change of a corresponding characteristic variable.

A method for recalibrating a micromechanical sensor is described in German Patent Application No. DE 10 2018 207 573 A1. In the conventional case of a micromechanical rotation rate sensor having a positive frequency split, the following correlation between change Δ of a test signal T generated, in this case, by suitable quadrature electrodes and sensitivity S supplies a sufficiently accurate estimation to be able to carry out a self-calibration based thereon:

$$\Delta S = CF \cdot \Delta T + C_0$$

where:

S is a sensitivity of the sensor

T is a test signal

CF is a correlation factor between change in sensitivity and test signal $C_0$ is a constant term in processing specification This mathematical relationship, i.e., in particular, correlation factor CF of the linear term as well as constant term $C_0$ is typically empirically determined and depends on various factors, such as e.g., the design of the sensor element, the packaging used and, not least, the stresses or aging of the sensor system caused by installation or usage conditions.

In the case of a micromechanical rotation rate sensor having a negative frequency split, it was experimentally ascertained that such an empirically determined correlation only supplies a considerably lower accuracy of the estimation of the change in the sensitivity, and is thus hardly usable for an accurate self-calibration. Further analyses have shown that the reason for this is a strong dependence of the correlation factor on the manufacturing tolerances or the variance of the processes used and their parameters pp, i.e., the following applies:

$$CF = f(pp)$$

More precisely, the following highly non-linear relationship may be established:

$$CF(pp) = \frac{\gamma(pp)}{\gamma(pp) + \epsilon}$$

where:

$\gamma = \partial S/\partial g$ is a change in sensitivity S of the sensor as a result of change in electrode spacing g $\epsilon$ is an empirical factor without strong dependence on process parameters, here only parameter $\gamma$ being highly dependent on the manufacturing tolerances or process parameters, and parameter $\epsilon$ describing a property which essentially depends on the design of the sensor element and the stresses which have occurred until the self-calibration is carried out. Typically, parameter $\epsilon$ may be determined with sufficient accuracy, e.g., by empirical experiments. In contrast, the property of the sensor element which is characterized by parameter $\gamma$ in this case cannot be directly determined by measurements, but must, in turn, be determined from a suitable estimation, e.g., from further characteristics with the aid of multi-linear regression:

$$\gamma(pp) = \sum_i \alpha_i \cdot FT_i(pp), i = 0, \ldots , n$$

where:

$FT_i$ is a characteristic which is measured, e.g., during the final trim of the sensor $\alpha_i$ are weighting factors of characteristics $FT_i$ (with the special case $FT_0 = 1$, i.e., a simple constant factor)

pp is a process parameter (is used to characterize high dependence of a parameter on the manufacturing processes and their variances)

In the process, the suitable characteristics $FT_i$ may be highly dependent on the manufacturing process.

Of course, further relationships not stated here, in particular, non-linear relationships, are also possible. Overall, it is possible to achieve an accurate and robust self-calibration using this entirely part-specific approach, even in the case of a rotation rate sensor having a negative frequency split.

Advantageously, the described approach, however, is not limited to this case, but, after appropriate adaptation and based on a comparable physical understanding or also with the aid of experimental identification of relevant dependencies, may be applied to other sensor systems.

FIG. 1 schematically shows a self-calibration described in German Patent Application No. DE 10 2018 207 573 A1 for a channel of a rotation rate sensor having a negative frequency split. In the process, a change in test signal T is represented on the horizontal axis, and a change in sensitivity S to be determined is represented on the vertical axis. A "point cloud" is apparent, including a processing specification $V_1$ represented by a dash-dotted line, having a slope determined by CF and a constant term $C_0$ according to equation (1). In the process, each data point of the point cloud corresponds to a sensor which, after the final trim, was exposed to an external stress, such as may arise, e.g., as a result of the soldering onto a circuit board in the application environment.

An accurate and robust self-calibration may be achieved when the data points are distributed closely around processing specification $V_1$ indicated in equation (1) and shown in FIG. 1 by a dash-dotted line. It is furthermore apparent that this only applies to a limited extent in the case of FIG. 1.

Figure 2:
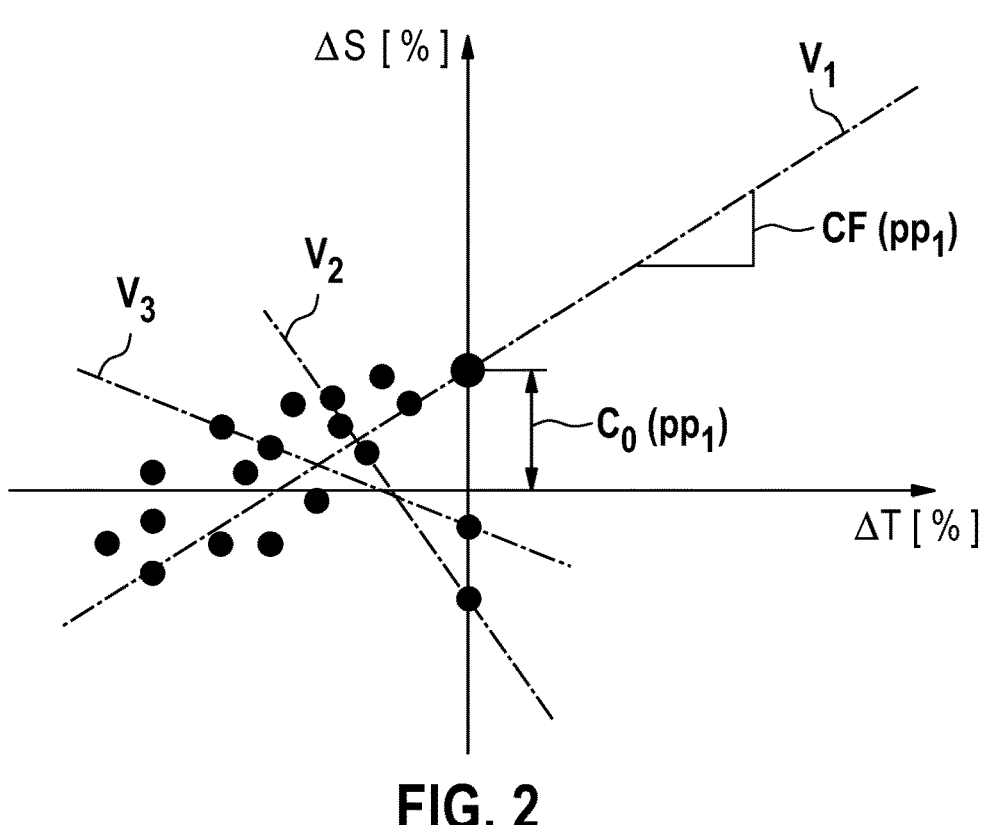
FIG. 2 shows a trim diagram used for a provided diagnosis of a sensor system, in accordance with an example embodiment of the present invention.

FIG. 2 shows a part-specific estimation according to the provided method for the same data points from FIG. 1. More precisely, the three processing specifications $V_1, V_2, V_3$ for self-calibration, represented by dash-dotted lines, are shown for three essentially different process points by way of example. Corresponding to the provided method, a corresponding processing specification $V_i$ may be stored in each sensor system during the final trim. In FIG. 2, data points, which in each case are situated close to one of processing specifications $V_1, V_2, V_3$ shown by way of example, correspond to sensors having similar process points and may thus, despite a considerably different change in the values of the test signal and sensitivity, be self-calibrated with high accuracy in accordance with the method according to the present invention. According to the present invention, a processing specification $V_i$ which allows a best possible self-calibration is provided for each sensor.

Figure 3:
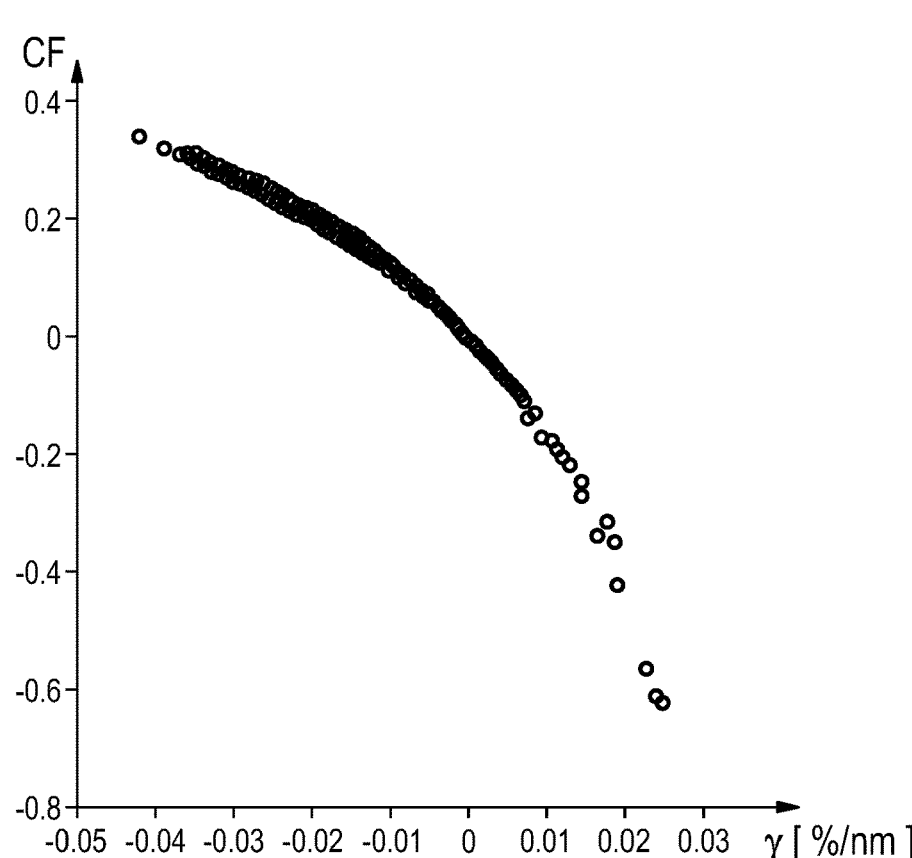
FIGS. 3 and 4 show examples of part-specific trim data of a sensor system, in accordance with an example embodiment of the present invention.
Figure 4:
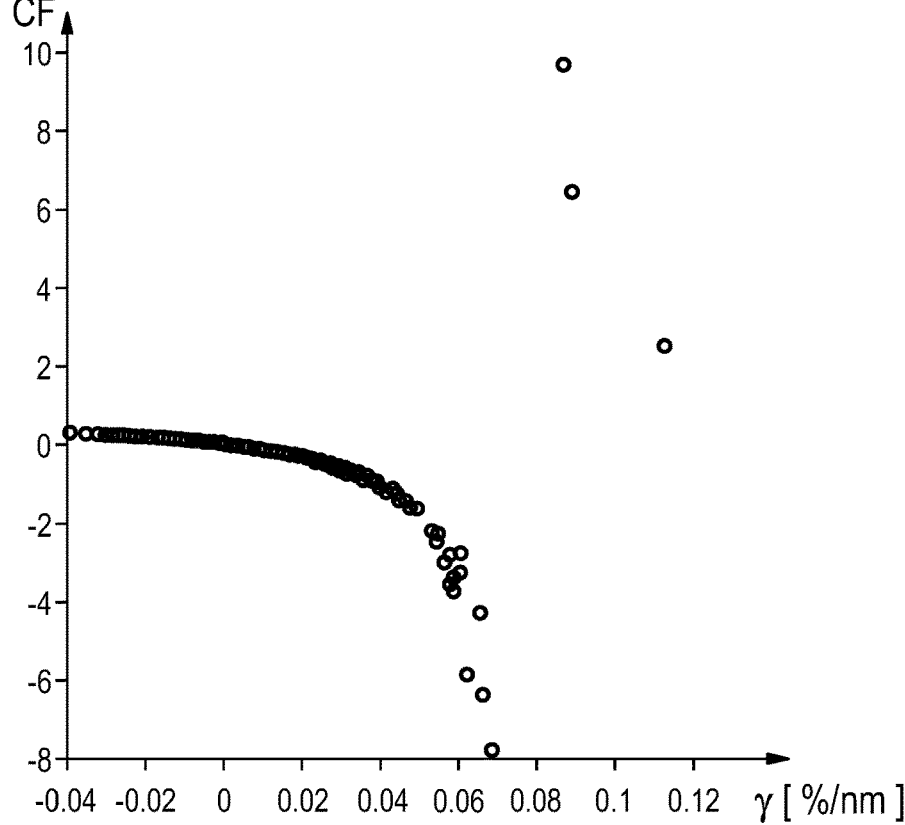

FIGS. 3, 4 show physical relationships in the form of dependencies of correlation factor CF on a further characteristic variable for two different channels of an observed sensor system, which each represent a sensor element.

Changes in sensitivity $\gamma$ are plotted against a change in the electrode spacing on the x axis. FIGS. 3, 4 in each case show a different channel for a large number of sensors having typically assumed variances of the process parameters, as they occur, e.g., in a mass production with high quantities. A corresponding equation (3) is shown on the x axis as a characteristic variable $\gamma$, and correlation factor CF, i.e., the gradient of the correlation used for the self-calibration corresponding to equation (1), is shown on the y axis. In FIG. 3, a fluctuation of correlation factor CF in a range of approximately 0.3 to approximately −0.6 is apparent, so that averaging would lead to a considerably worse result of the self-calibration.

It is therefore provided to ascertain a part-specific correlation factor for each sensor element, which only depends on the manufacturing tolerances which occurred in a part-specific manner or variance of the processes used during manufacture. A non-linear relationship between the variables corresponding to equation (3) is apparent, in particular, in FIG. 4, since the correlation factor here takes on a larger value range, which is defined by the design of the sensor element.

Figure 5:
FIG. 5 shows a dependence of a characteristic sensor variable on further directly measurable variables, in accordance with an example embodiment of the present invention.

FIG. 5 shows an ascertainment of characteristic variable $\gamma$ plotted on the vertical axes in FIGS. 3, 4. In this case, it is a sensor property which may have great influence on the relationship used in the self-calibration and may also be highly dependent on the variance of the manufacturing processes used, which, in turn, is illustrated by the plurality of represented sensors. In general, this variable is not readily directly measurable for the examined sensor system, i.e., it must be determined indirectly from further available variables.

With the aid of the multi-linear regression stated in equation (4), the determination of this characteristic variable $\gamma$ in this case is possible based on two further sensor properties which are directly ascertainable in the final trim. In the process, equation (4) represents a specific example of the more general formulation according to equation (3):

$$\gamma = \alpha_0 + \alpha_s S_{Ref} + \alpha_T T_{Ref} \qquad (4)$$

where:

$S_{Ref}$ is a sensitivity of the sensor element prior to final trim $T_{Ref}$ is a value of the test signal used during the final trim $\alpha_0, \alpha_S, \alpha_T$ are weighting factors used.

The agreement achieved with this not very complex method is assessed as being sufficient to ascertain the coefficients required in the relationship according to equation (1) with sufficient accuracy, using the non-linear dependence according to equation (2). FIG. 5 thus shows how the value of the characteristic variable stated in equation (3) may be determined as a function of measurable variables.

Figure 6:
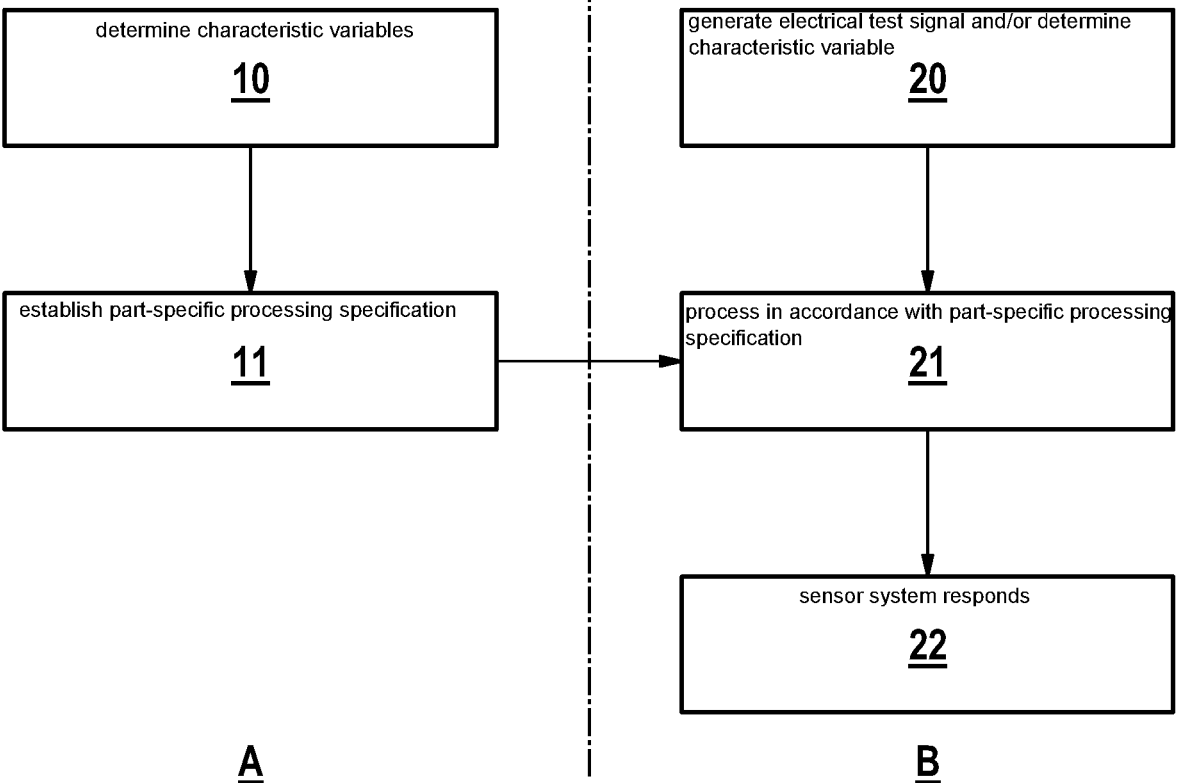
FIG. 6 shows a sequence of a first specific embodiment of a provided method for operating a sensor system, in accordance with the present invention.

FIG. 6 shows a schematic sequence of the described method for diagnosing a sensor system in a part-specific manner. In the process, A shows a phase which may be carried out independently of the method being carried out and, e.g., during the final trim of the sensor system. B shows a phase while the diagnosis is being carried out, in accordance with the provided method.

In a step 10, first a determination of characteristic variables is carried out, and thereafter, in a step 11, a part-specific processing specification $V_i$ is established based thereon.

In a step 20, an electrical test signal is generated and/or a characteristic variable is determined, e.g., for carrying out the actual diagnosis, in a step 21 a processing is carried out in accordance with part-specific processing specification $V_i$ ascertained in step 11, which, e.g., may include the processing of a measured response of the sensor element to the generated test signal or the value of the characteristic variable or its change. In a step 22, a suitable response of the sensor system takes place as a function of a result from step 21. In the case of the use of the method according to the present invention for self-calibration, a correction of the sensitivity of the sensor system may take place, for example, and in the case of the use for monitoring, feedback may be provided to the user about the state of the sensor system.

Figure 7:
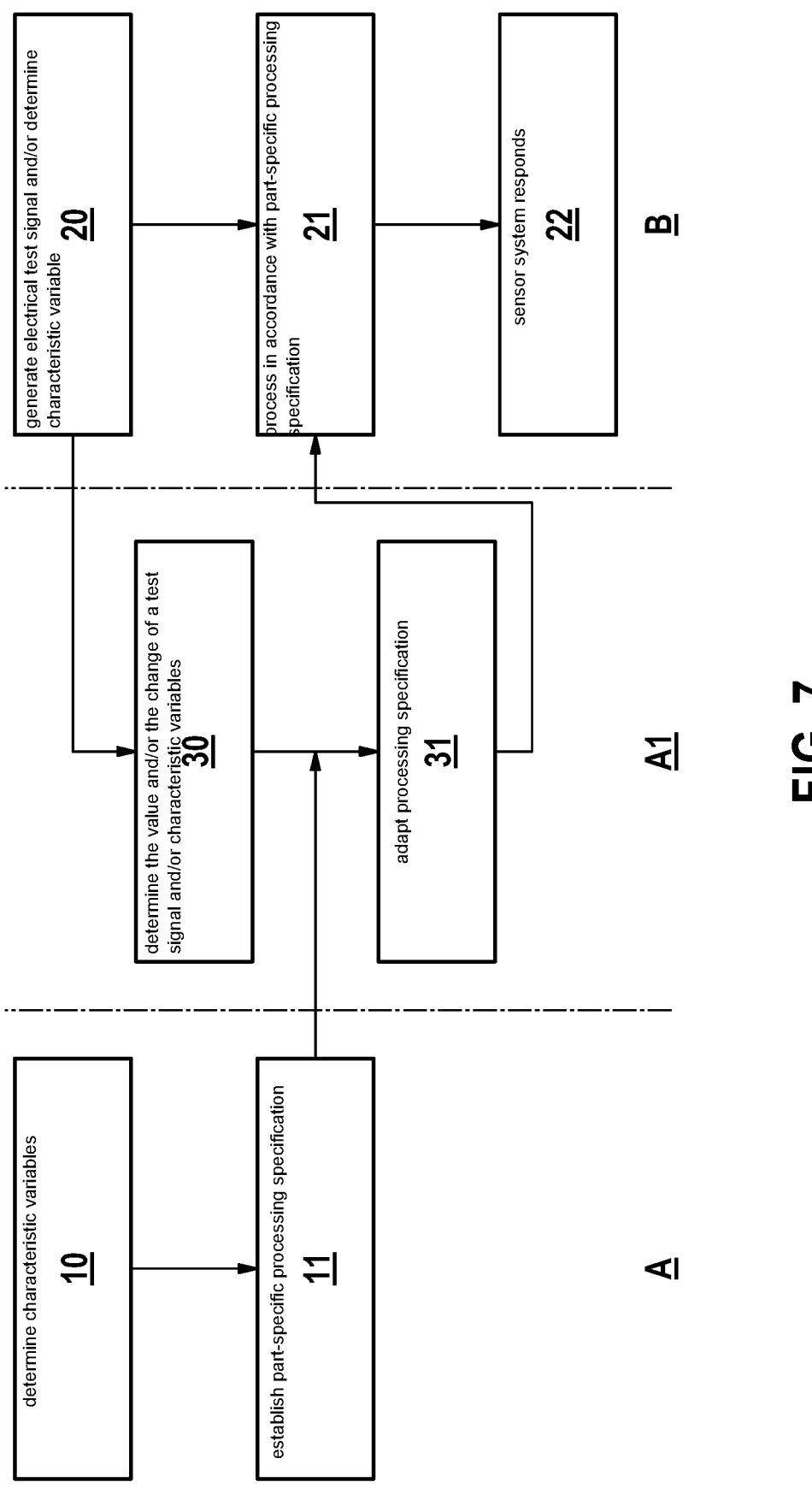
FIG. 7 shows a sequence of a second specific embodiment of a provided method for operating a sensor system, in accordance with the present invention.

FIG. 7 shows a variant of the described method for diagnosing a sensor system in a part-specific manner. For the sake of simplicity, only differences compared to FIG. 6 are explained here. A1 represents a phase during operation during which processing specification $V_i$ may be adapted in a defined manner.

For this purpose, in a step 30, first the value and/or the change of a test signal and/or of characteristic variables is/are determined, and in a step 31, an adaptation of processing specification $V_i$ in accordance with a relationship established in advance takes place.

The sequences of the method in phases A, B remain unchanged compared to FIG. 6.

It shall be understood that the described methods advantageously are completely independent of a specific sensor type. The above-explained application to micromechanical sensors having typically high manufacturing tolerances, in particular, micromechanical rotation rate sensors having a negative frequency split and the shown dependencies resulting therefrom is therefore to be regarded only by way of example.

Advantageously, the method according to the present invention may be implemented at least partially as software and/or at least partially as hardware, which is executed, for example, on a microprocessor of the sensor element. This supports an easy adaptability of the method.

Advantageously, the diagnosis and/or the recalibration of the sensor element may be carried out at defined points in time, e.g., daily, weekly, monthly, etc., it being possible for a suitable point in time, e.g., to be established by a host system.

In summary, a method for diagnosing, in particular, self-monitoring and self-calibrating a sensor system is provided, with the aid of which, e.g., a change in a sensitivity may be established and may be accordingly recalibrated. In the self-monitoring application case, it may be established, e.g., for safety-critical applications, whether a correct functional capability of the sensor system exists or not. According to the present invention, in the process a part-specific interpretation of a test signal and/or of characteristic variables or their respective change during operation of the sensor is used, the part-specific processing specification being provided even before that, e.g., during the manufacture of the sensor system or during the final trim, regardless of the diagnosis being actually carried out.

Those skilled in the art will suitably modify the features of the present invention and/or combine them with one another, without departing from the core of the present invention, in view of the disclosure herein.

What is claimed is:

1. A method for carrying out a diagnosis of a sensor system, comprising the following steps:
    (i) ascertaining a plurality of processing specifications of test signals and/or of a characteristic physical variable and/or a respective change of a test signal and/or the characteristic physical variable, as a function of at least one part-specific property of the sensor system; and
    (ii) carrying out a subsequent diagnosis of a sensor element of the sensor system, using the plurality of processing specifications ascertained in (i),
    wherein a part-specific correlation factor is ascertained for each sensor element of the sensor system which is a function of a respective part-specific processing specification,
    wherein the sensor system comprises a micromechanical rotation rate sensor having a negative frequency split, the diagnosis being carried out using a part-specific correlation factor determined for the negative frequency split design.

2. The method as recited in claim 1, further comprising: carrying out a recalibration of the sensor element of the sensor system as a function of a result of the diagnosis.

3. The method as recited in claim 2, wherein the diagnosis and/or the recalibration of the sensor element is carried out at defined points in time.

4. The method as recited in claim 1, wherein feedback of the sensor system is provided to a user as a function of a result of the diagnosis.

5. The method as recited in claim 1, wherein a constant term of the processing specification takes on the following form:

$$C_0 = CF(pp) \cdot \beta$$

where:
$\beta$ is a constant which is not part-specific, but is empirically ascertained based on a large number of identical sensor elements.

6. The method as recited in claim 1, wherein the processing specification is changed over a service life of the sensor system.

7. A method for manufacturing a sensor system, comprising the following steps:
    a) ascertaining, in a part-specific manner, a mathematical relationship between a test signal and a response signal of a sensor element of the sensor system to the test signal; and
    b) implementing the mathematical relationship ascertained in step a) in the sensor system after a final trim of the sensor element,
    wherein the sensor system comprises a micromechanical rotation rate sensor having a negative frequency split, the diagnosis being carried out using a part-specific correlation factor determined for the negative frequency split design.

8. The method as recited in claim 7, wherein parameters of the ascertained mathematical relationship are calculated in the part-specific manner and stored in the sensor system.

9. The method as recited in claim 7, wherein the mathematical relationship is at least partially implemented in software and/or at least partially in hardware.

10. The method as recited in claim 8, wherein the mathematical relationship is stored by programming a programmable chip.

11. The method as recited in claim 7, wherein the mathematical relationship is changed over a service life of the sensor system.

12. The method as recited in claim 7, wherein the mathematical relationship for a defined sensor type encompasses an approximation according to defined physical relationships.

13. A non-transitory computer-readable data medium on which is stored a computer program for carrying out a diagnosis of an electronic sensor system, the computer program, when executed by the electronic sensor system, causing the electronic sensor system to perform the following steps:

(i) ascertaining a plurality of processing specifications of test signals and/or of a characteristic physical variable and/or a respective change of a test signal and/or the characteristic physical variable, as a function of at least one part-specific property of the sensor system; and (ii) carrying out a subsequent diagnosis of a sensor element of the sensor system, using the plurality of processing specifications ascertained in (i), wherein the sensor system comprises a micromechanical rotation rate sensor having a negative frequency split, the diagnosis being carried out using a part-specific correlation factor determined for the negative frequency split design.

* * * * *